April 25, 1944.  R. F. WALKER  2,347,306
FLUID FLOW INDICATOR
Original Filed Nov. 14, 1942
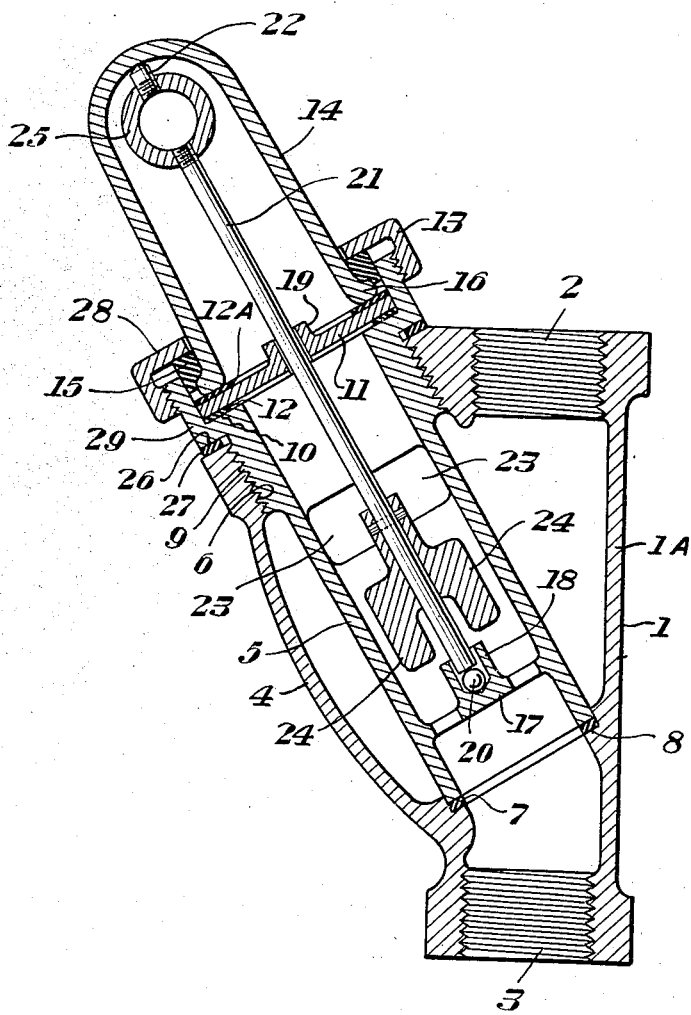
INVENTOR
Richard F. Walker
by his attorneys
Stebbins, Blenko & Webb Patented Apr. 25, 1944

2,347,306

UNITED STATES PATENT OFFICE 2,347,306

FLUID FLOW INDICATOR

Richard Fife Walker, Cheltenham, England, assignor to Walker, Crosweller & Company Limited, Cheltenham, England Original application November 14, 1942, Serial No. 465,585. Divided and this application April 6, 1943, Serial No. 481,976. In Great Britain October 31, 1941

10 Claims. (Cl. 116—117)

This invention has reference to appliances for indicating whether fluid is flowing through a pipe line and, at the same time, giving an approximate indication as to the rate of such flow. This is a division carved from my copending application, Serial No. 465,585, filed November 14, 1942, for Fluid flow indicators.

The invention is concerned with the type of indicator which comprises a body portion of tubular formation adapted to be connected in a pipeline along which fluid may flow, the said body containing a rotor which is located in an internal fluid passage and is carried by a spindle projecting from the body. Thus, as fluid flows along the pipe line and through the appliance, it causes the rotor and spindle to rotate and, as the latter is readily visible, it serves as a convenient means for indicating whether or not the fluid is in motion; further the speed of rotation of the spindle may give an approximate indication as to the rate of flow of the fluid.

One object of the invention is to provide an improved construction of indicator particularly adapted for use in vertical pipe lines, wherein an effective drive is imparted to the rotor.

Another object of the invention is to prevent fluid escaping from the body through the spindle opening even when the fluid is under pressure.

Another object of the invention is to enable the indicator to operate satisfactorily whether the spindle is located vertically upwards or downwards, or at any position intermediate these vertical positions.

A still further object of the invention is to provide an indicator which will operate efficiently in a pipe line wherein the direction of fluid flow may alternate, either intentionally or inadvertently.

Further objects of the invention will be apparent from the following description of a preferred indicator shown in the accompanying drawing, which shows the indicator in vertical sectional elevation.

The drawing shows a vertical sectional view of the indicator.

The fluid flow indicator shown in the said drawing has a body 1 comprising a tubular portion 1A and a lateral enlargement 4 opening out of the portion 1A. The tubular portion 1A is formed with tapped openings 2, 3, located co-axially or in alignment, at the opposite ends thereof; the opening 2 serves as a fluid inlet port whereas the opening 3 serves as an outlet for the fluid. The tapping of the said openings enables the indicator to be so connected in a pipe-line through which fluid is adapted to flow, that the fluid must pass through the body 1.

The axis of the enlargement 4 is inclined at an angle to the axis of the tubular portion 1A; the enlargement has a tapped opening 6 adapted to receive a sleeve 5. Adjacent its outer end, the latter is screw-threaded externally along an enlarged diameter portion 9 which is adapted to make a screwed engagement within the tapped opening 6.

The inner end of the sleeve 6 is arrangd to abut on to an annular seating 8 formed within the tubular body portion 1A adjacent the outlet port, thereby cutting off the said port from the inlet port 2. As the sleeve is screwed on to the said seating, an external peripheral shoulder 26, formed around its periphery by a still larger diameter portion 29, seats upon the external surface of the enlargement. To ensure that no leakage of fluid can take place from the enlargement 4, a compressible washer 7 is clamped between the inner end of the sleeve 5 and the seating 8 and another such washer 27 is clamped between the body enlargement and the shoulder 26.

The outer end or largest diameter portion 23 of the sleeve 5, is formed internally with an annular seating 10 whereon a disc 11, having compressible annular washers 12 and 12A applied to the periphery of each face and a central bush 19, is carried. A spider 17 extends transversely of the sleeve adjacent its inner end, the said spider being arranged to carry a cup 18 on its face remote from the said inner end. This cup serves as a housing for a ball-bearing 20 for locating and supporting, in a substantially frictionless manner, one end of a spindle 21 extending axially of the sleeve 5. Intermediate the disc 11 and spider 17, the sleeve is formed with a plurality of ports 23 thereby providing communication, through the said sleeve, between the inlet and outlet ports 2 and 3. Finally the largest diameter sleeve portion 29 is provided with an external screw-thread to enable a collar 13 to be coupled thereto. This collar is formed internally with an annular flange 28 adapted to pass around a transparent dome 14 and, by acting on a peripheral lip 16 around the mouth of the latter, to thrust the said mouth tightly on to the disc 11. A compressible washer 15 is interposed between the flange 28 and lip 16, whereas the washer 12A is interposed between the said lip and the disc. Thus, when the collar is screwed fully on to the sleeve portion 29 a tight seal is made around the mouth of the dome 14 so that the air contained in the latter cannot leak to the atmosphere. Moreover the thrust of the dome 14 on the disc 11 compresses the washer 12 between the latter and the seating 10, thereby effecting another seal for preventing the leakage of fluid from the sleeve 5. Since air cannot escape from the dome only a limited volume of fluid can pass from the sleeve 5, through the bush 19, into the interior of the transparent dome.

The spindle 21, seated at its inner end upon the bearing 20, extends through the bush 19 towards the crown of the transparent dome, its upper end being fitted with a ring 25 (or any other suitable means which will provide a readily visible indication that the spindle is rotating). A spindle extension 22, having its end tapering to a point, is assembled to the ring and its point makes a substantially frictionless contact with the crown of the dome.

Owing to the limited amount of fluid which can flow into the dome through the bush 19, the ring 25 cannot be submerged by the said fluid and, therefore, it cannot be hidden or obscured thereby; likewise the rotation of the spindle cannot be obstructed as it would be if the ring became so immersed.

Propeller blades 24 are formed or provided upon the spindle 21 intermediate the ports 23 and the spider 17, the said blades being of such dimensions that they extend close to the wall of the sleeve 5, just sufficient clearance being provided to enable the blades to travel freely around within the interior of the sleeve. The blades are curved so that a flow of fluid in either direction will propel them around the sleeve and consequently rotate the spindle within the cup 18 and bush 19. Any suitable form of propeller may be adopted. For example, in the drawing, the blades are cast integrally with a hub pinned to the spindle. Alternatively they may be formed separately and attached to a hub or even direct to the spindle in which case, preferably only one blade is provided, this being of spiral configuration as would be produced by expanding a split washer or ring. The pitch of the blades may be variable, or blades or various pitches may be provided, so that the indicator may be adjusted or specially provided to suit any particular rate of fluid flow which it is expected will flow through the indicator.

The normal direction of fluid flow is from the inlet port 2, through the ports 23, the sleeve 5 from which it is discharged into the tubular body portion 1A and then through the outlet port 3. During its passage through the sleeve 5 the fluid not only exerts a rotary pressure on the blades, but also a component force acting along the spindle in the direction of the spider; this component force tends to take the spindle into the cup 18 and increases its thrust on the bearing 20; however, owing to the nature of the bearing the frictional resistance offered to the rotation of the spindle is not materially increased. Similarly, should the direction of flow be reversed, the said force component acting on the spindle through the blade, would tend to displace the former away from the spider 17. However, this is prevented by the spindle extension 22 bearing on the inside of the crown of the dome.

Due to the slight clearance between the propeller blades and the inside of the sleeve, the spindle will be rotated by a slight flow of fluid and the speed of rotation will increase in proportion to the said flow. Thus, as the ring is clearly visible through the transparent material of the dome, and as the ring 25 rotates with the spindle, the said ring is adapted to give, not only a visible indication that the spindle is rotating, but also an approximate indication of the speed of such rotation.

The contact of the spindle extension against the crown of the dome and against the bearing 20 also ensures that the indicator will operate sufficiently even though it be inserted in a pipeline in the reverse position to that shown in the drawing, or in a pipe-line which is not vertical.

Having described my invention what I claim and desire to secure by Letters Patent is:

1. A flow indicator comprising a body having fluid inlet and outlet ports and an internal chamber, and a sleeve extending into engagement with a seating in said chamber and thereby cutting off the inlet port from the outlet port, said sleeve having apertures therein for re-establishing said communication, a bladed spindle carried within the sleeve and extending into a transparent dome outside the sleeve and adapted to be rotated by fluid flowing over the blades in passing through the sleeve from the inlet to the outlet port.

2. A flow indicator comprising a body having fluid inlet and outlet ports and an internal chamber, and a sleeve extending into said chamber into abutment with an annular seating within the body to cut off communication between the inlet port and outlet port, the said sleeve having apertures for re-establishing said communication and a bladed spindle carried within the sleeve and extending into a transparent dome located externally of the sleeve and adapted to be rotated by fluid when the latter flows through the sleeve from the inlet to the outlet port.

3. A flow indicator comprising a body having inlet and outlet ports, arranged in coaxial alignment, and an internal chamber, a sleeve extending into engagement with a seating pin said chamber at an angle to the axis of the said ports, said sleeve thereby cutting off communication between the inlet and outlet ports and having apertures for re-establishing said communication, a rotatable spindle carried within the sleeve and extending into a transparent dome located outside the sleeve, and propeller blades on the said spindle over which fluid flows, when passing through the sleeve from the inlet port to the outlet port, to rotate the said blades and spindle.

4. A flow indicator comprising a body having inlet and outlet ports, arrange in co-axial alignment and adapted to be connected into a pipe-line, and an internal chamber, an open-ended sleeve extending into the said chamber into abutment with an annular seating within the body to cut off communication between the inlet port and the outlet port, said sleeve having apertures therein for re-establishing communication between said ports through the inner open end of the sleeve, a spindle located co-axially of the sleeve and extending into a transparent dome secured in the outer open end of the said sleeve, and blades arranged on the said spindle between the sleeve apertures and the inner open end of the sleeve.

5. A flow indicator comprising a body having a pair of co-axial ports adapted to be coupled into a pipe-line to receive and discharge fluid and an internal chamber, an open-ended sleeve extending into the said chamber, at an angle to the axis of the ports and into abutment with an annular seating in the body to cut off communication between the ports, the said sleeve having apertures for re-establishing said communication through the open inner end of the sleeve, and an internal shoulder in its open outer end, a bushed disc seated on said shoulder and a transparent dome, located outside the sleeve, seated on the said disc, a spindle rotatably mounted in the sleeve and extending, through the bush in the disc, into the said dome, propeller blades on the disc adapted to be driven, for rotating the spindle, by fluid flowing between the sleeve apertures and the outlet port and visible means on the spindle within the dome for indicating when the spindle is rotating.

6. A flow indicator comprising a body having a pair of co-axial ports, adapted to be coupled into a pipe-line, and a chamber having an opening disposed laterally of said ports, an open-ended sleeve, extending into the chamber on to an annular seating within the body for cutting off communication between the ports, and having apertures for re-establishing said communication through the inner open end of the said sleeve, a disc, mounted in the outer open end of the sleeve and having a central bush, a dome seated on said disc, a rotatable spindle located axially within the said sleeve and extending through the said bush into said dome, visible means on the spindle within the dome for indicating when the spindle is rotating, blades on the spindle, between the sleeve apertures and the said inner open end, said blades being adapted to be driven by flow of fluid, between the apertures and inner open end, for rotating the said spindle.

7. A flow indicator comprising a body having a pair of co-axial ports, adapted to be coupled into a pipe-line, and a chamber having an opening located laterally of said ports, an open ended sleeve, extending into said chamber on to an annular seating within the body for cutting off communication between the said ports, and having apertures for re-establishing said communication through the inner open end of the sleeve, a disc located within the outer open end of the sleeve and having a central bush, a transparent dome seated on said disc, means for clamping the dome on to the disc, means for effecting a fluid tight seal between the interior of the dome and the atmosphere, a spindle located co-axially within the sleeve and extending through the bush into the dome, blades on the spindle in the path of the fluid flow and adapted to be driven by the said flow for rotating the spindle, and means on the spindle within the dome for giving visual indication when the spindle is rotating.

8. A flow indicator comprising a body having a pair of co-axial ports adapted to be coupled into a pipe-line, and a chamber having an opening disposed laterally of the said ports, an open-ended sleeve extending into engagement with a seating in said chamber, at an angle to the axis of the ports, and thereby cutting off communication between the said ports, said sleeve having apertures for re-establishing said communication through the open inner end of the said sleeve, a spider disposed transversely of the sleeve adjacent said inner end, a cup on said spider, a spindle located co-axially of said sleeve and seating on a ball bearing within the said pocket, a disc, having a central bush, seated within the open outer end of the sleeve, a dome seated in an air tight manner on said disc, the spindle extending through the said bush into the said dome, propeller blades on the spindle between the sleeve openings and the spider and adapted to be driven by the flow of fluid to rotate the spindle, and visible means on the spindle within the dome for indicating when the said spindle is rotating.

9. A flow indicator comprising a body having a pair of co-axial ports to permit of the passage of fluid therethrough, and an internal chamber having an opening disposed laterally of said ports, an open-ended sleeve extending through said opening into engagement with a seating in said chamber and thereby cutting off communication between the ports, the said sleeve having apertures for re-establishing said communication through the inner open end of the sleeve, a disc seated in the outer open end of the sleeve and having a bushed aperture thereon, a transparent dome seated in a fluid-tight manner at its mouth on said disc, a rotatable spindle located axially of the sleeve and extending through the bushed aperture into the dome, propeller blades on the spindle in the path of fluid flow for rotating the spindle, means located on the spindle for giving visual indication when the said spindle is rotating and a spindle extension on said indicating means for contacting the crown of the dome.

10. A flow indicator comprising a body having a pair of co-axial ports to permit of the passage of fluid therethrough, and an internal chamber, an open ended sleeve extending into engagement with a seating in said chamber at an angle to the axis of the ports and thereby cutting off communication between said ports, said sleeve having apertures for establishing said communication through its inner open end, a disc in the outer open end of the sleeve and having a central bush, a transparent dome seated at its mouth on said disc, a spindle located co-axially of the sleeve, a transverse spider adjacent the inner open end of the said sleeve and having a bearing for receiving and supporting the inner end of the spindle, propeller blades on the spindle, between the sleeve apertures and the spider, adapted to be driven by flow of fluid for rotating the spindle, the said spindle extending through the said bush into the dome, means carried by the spindle within the dome for giving visible indication of rotation, and a spindle extension carried by said indicating means and having a tapered end which contacts the crown of the transparent dome.

RICHARD FIFE WALKER.